Figure 1:
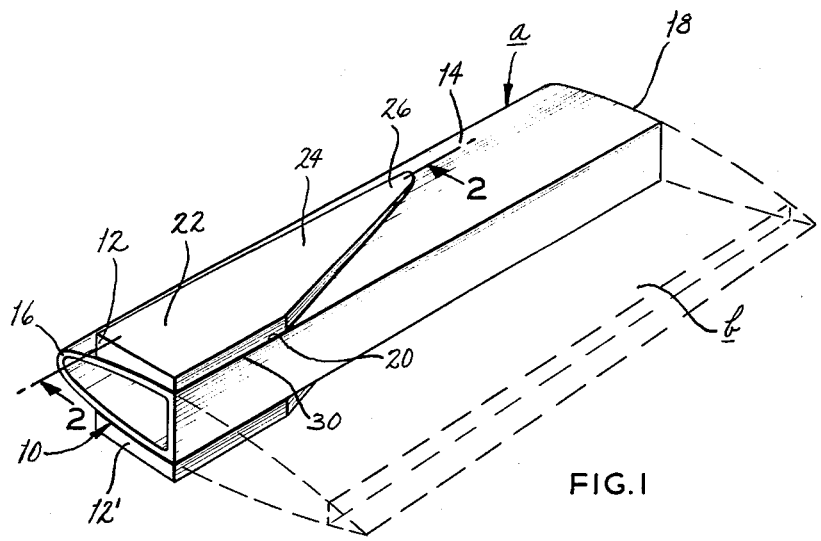

March 8, 1966 W. E. BROWNLEE 3,239,011
HELICOPTER ROTOR BLADE SPAR STRUCTURE
Filed Nov. 23, 1964

INVENTOR
WINSTON E. BROWNLEE
BY
ATTORNEY

United States Patent Office 3,239,011
Patented Mar. 8, 1966

3,239,011
HELICOPTER ROTOR BLADE SPAR STRUCTURE
Winston E. Brownlee, Suttons Bay, Mich., assignor to Parsons Corporation, Traverse City, Mich., a corporation of Michigan
Filed Nov. 23, 1964, Ser. No. 413,199
2 Claims. (Cl. 170—159)

The present invention relates generally to helicopter rotor blades having metal spars whose outer surface forms part of the airfoil contour, and more specifically to metal reinforcing doublers of the type utilized at the root end of such spars and a method for brazing such reinforcements thereto.

In securing a doubler to the surface of a steel spar, brazing is an obviously desirable manner of securement. However, doublers covering broad areas may prove hazardous, by reason of the inclusion, within the covered areas, of portions which are "starved," that is, which lack sufficient braze material. Particularly where the doubler is located at the root end of the spar, to fit it within a root retention fitting, such area portions having insufficient braze material are subject to failure under the bending loads which are experienced in each cycle of operation. The loading on such a root end doubler is likely to be critical near its spanwise outboard end where the load transfer through the brazed joint is greatest. This will be true even though the doubler end has been thinned taperingly and in planform, in accordance with good engineering practice.

In investigating the possibility of failures in this area, I have found that thinning the doubler intensifies the problem of insufficient braze material in the joint. This may be due to the increased flexibility which results from thinning the end of the doubler; when such thinned end is clamped in place for brazing, its flexibility (in contrast to that of the thicker portion of the doubler) may permit it to clamp so closely against the spar surface as to squeeze out the braze material, yielding a thinner brazed joint than may be specified.

In other fields, not those where joint thickness is critical but merely as a matter of assembly practice, thin sheet metal workpieces have heretofore been dimpled inwardly on one surface, so as to emboss the opposite surface with spacing projections which extend therefrom a distance equal to the desired brazed joint thickness. The sheet metal workpieces so dimpled have not, to my knowledge, been of comparable thickness to structural doublers such as are used at the root ends of helicopter rotor blades; in any event, heretofore it would have been unthinkable to apply a dimpled piece of metal to a helicopter rotor blade at a region subject to repetitions of cyclic loading at a high stress level. As is well known, dimpling or other indentation of a piece of metal imparts stress concentrations and provides loci for fatigue failure.

I have invented a spar and reinforcement therefor in which the reinforcement consists of a doubler whose thinned outboard portion has on its undersurface integral embossed rounded spacing projections, but whose outer surface is smooth, unindented and substantially free from intense stress concentrations such as would normally exist within a dimple. The part of such thinned portion in which said spacing projections are located is thinned in an amount more than the distance by which the projections extend inward from its undersurface. In the method of the present invention, said part of the outboard portion is dimpled prior to thinning; that is, the doubler blank is first dimpled on its outer surface to provide projections extending from its undersurface. Later (preferably after brazing it onto the spar), it is thinned by removing material from its outer surface to a depth greater than the depth of dimpling; by this material-removing operation I effect the taper in thickness which makes the outboard thinned end relatively flexible.

The objects of the present invention include providing a brazed doubler onto the surface of that type of steel spar whose outer surface forms part of the airfoil contour, which doubler although tapering to a thinned outboard, has during the brazing process, been maintained positively at a spacing from the surface of the spar such as will assure the desired thickness of the brazed joint.

A further purpose is to provide a doubler attached to a metal rotor blade, which doubler includes a relatively flexible thinned area effectively free from hazardous stress concentrations, and spaced from the blade spar by braze material whose thickness has been positively established.

A still further object is to provide a method of making a metal doubler for a helicopter rotor blade and applying it in a brazing operation to the outer surface of a blade spar in such manner as to assure a joint of brazed material free from starved areas and of desired thickness, despite the flexibility of the taperingly thinned outboard portion of such doubler.

Figure 2:
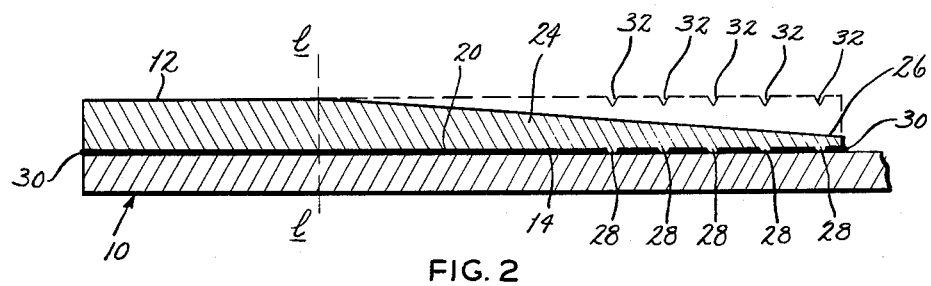

Utilization of the invention will become apparent to those skilled in the art from the disclosure made in the following description of the preferred embodiment of the invention as illustrated in the accompanying drawing, in which:

FIG. 1 is a perspective view of the root end of the rotor blade embodying the present invention; and FIG. 2 is an enlarged fragmentary cross-section taken along line 2—2 of FIG. 1.

Referring now to the drawing, wherein like reference characters designate like or corresponding parts throughout the several views, there is shown in FIG. 1 a helicopter rotor blade structure, generally designated $a$, of the type having a steel tubular spar 10 which extends the full span length of the rotor blade structure $a$. Reinforcing members or doublers 12 and 12' are utilized for receiving and securing a bolted root end retention fitting (not shown) for connection to the helicopter rotor hub. The blade after body $b$ shown in FIG. 1 in dashed lines and secured to the aft surface of the spar 10 is not a part of the present invention.

Because the upper and lower doublers 12 and 12' of the present invention are similar in construction, detailed reference will be made only to the upper root end doubler 12. As may be seen from FIG. 1, the outer surface 14 of the steel spar 10 is curvingly contoured to the general airfoil configuration and extends spanwise from the blade root end 16 to the outboard portion 18. The doubler 12 has its undersurface 20 conformed to the outer surface 14 of the spar 10 and is brazed to it throughout its length and breadth. Adjacent to the root end 16, the doubler 12 is provided with an inboard portion, designated 22, which as shown is rectangular in planform and of constant thickness throughout its length. To the right side of the dashed line 1—1 as viewed in FIG. 2, the doubler 12 is provided with an outboard portion 24 which tapers in planform to a tip 26. As later discussed, this outboard portion 24 is also thinningly tapered in cross-section.

Referring now to FIG. 2, where the doubler 12 and the upper portion of the steel spar 10 are shown in cross-section, it may be readily seen that the undersurface 20 of the steel doubler 12 is formed so as to be contoured complementary to the contoured outer surface of the steel spar 10. The upper or outer surface of the doubler 12 is smooth and unindented, to avoid stress concentrations.

FIG. 2 is enlarged to illustrate the plurality of integral embossed, rounded spacing projections 28 which extend from the undersurface 20. These rounded spacing projections are located in that part of the outboard portion 24 which is thinned by an amount more than the distance to which the projections extend from the undersurface 20. This location of the projections 28 will be more fully understood with reference to the following description relating to the method of producing them. Between the undersurface 20 of the doubler 12 and the outer surface 14 of the steel spar 10, there is provided a brazing alloy which forms a brazed joint 30 of the desired thickness.

The dashed lines of FIG. 2 show the thickness of the doubler 12 before it has been thinned to its outboard tip 26. The dashed indications of indentations 32 represent the dimples made in that portion of the doubler material which is removed upon thinning. In making the metal doubler 12, a blank of metal is first shaped to provide a substantially constant thickness in spanwise cross-section for its entire length, the undersurface being contoured in cross-section to complement the outer surface 14 of the spar 10. The spanwise outboard portion 24 of the doubler blank is then dimpled inwardly by placing it in a press having a dimpling or indenting punch member and a die plate member drilled out or indented opposite to the punch member. In the dimpling process, metal so dimpled is flowed downward so that the material opposite to the punched side is embossed into the drilled out or indented cavities of the die plate. This provides the rounded, embossed spacing projections 28 which extend from the undersurface 20 of the doubler 12 a distance equal to the desired brazed joint thickness.

For making the brazed assembly, brazing alloy is applied to the undersurface 20 of the doubler 12 and the outer surface 14 of the spar 10. The spar 10 and the doubler 12 are then clamped for brazing, the spacing projections 28 fixing the spacing of the spanwise outboard portion 24 from the outer surface 14 of the spar 10. In this manner it is assured that the outboard portion 24 will not, when it is clamped, squeeze out the brazed material, and thus "starve" the braze joint 30. Next follows the application of heat in any conventional manner to flow the braze material and form the brazed joint 30, whose thickness equals the amount which the spacing projections 28 so extend.

The spar 10 with the doubler 12 is then held within a suitable machine tool, such as a milling machine, and the doubler's outboard portion 24 is then thinned taperingly outboard from line 1—1 by removing that material represented by the dashed lines in FIG. 2. It is essential that this material be removed to a depth greater than the depth of dimpling so that the intense stress concentrations are removed.

Fatigue tests have proved the strength and reliability of blade spars reinforced by brazed doublers made according to these teachings. It appears that the predicted stress concentrations from dimpling exist principally at the indented surface; the same concentration factor is not applicable to the material which flows toward the undersurface; and upon removal of the material penetrated by the indentation, the danger of failure is satisfactorily overcome. Thus, in the present invention I successfully utilize the spacer effect of the embossing without suffering the dangers of stress concentrations incident to dimpling.

Obviously, many modifications and variations may be made in light of the above teachings. It is therefore to be understood that, within the scope of the appended claims, the invention may be practiced otherwise than is specifically described.

I claim:
1. In an improved helicopter rotor blade structure, a spar and reinforcement therefor comprising
   a steel spar extending spanwise from the blade root end and having an outer surface contoured to form a surface portion of the airfoil section of such blade,
   a steel doubler having an undersurface formed complementary to said contoured outer surface of said steel spar, said doubler having a smooth-finished, unindented outer surface and its said undersurface having a plurality of integral embossed rounded spacing projections extending therefrom the distance equal to a desired braze joint thickness, and
   a brazing alloy forming a brazed joint of such thickness between the outer surface of said steel spar and the undersurface of said metal steel doubler.

2. For use in securing a helicopter blade to a blade root retention member,
   the improved structure of claim 1, wherein
   said doubler having an inboard portion positioned adjacent to the root end of said steel spar, and
   an outboard portion tapering outboard in planform and thickness,
   the spacing projections being located in that part of the said outboard portion which is thinned, by such taper in thickness, an amount more than the distance by which the projections extend from its undersurface.

References Cited by the Examiner
UNITED STATES PATENTS

| | | | |
|---|---|---|---|
| 2,522,100 | 9/1950 | Diller | 29—156.8 |
| 2,712,356 | 7/1955 | Jovanovich | 170—159 |
| 2,828,531 | 4/1958 | Bath | 29—156.8 |
| 3,004,607 | 10/1961 | Linnabery et al. | 170—159 |

SAMUEL LEVINE, *Primary Examiner.*

JULIUS E. WEST, *Examiner.*